United States Patent [19]
Schuelein et al.

[11] Patent Number: 5,494,187
[45] Date of Patent: Feb. 27, 1996

[54] BREADBOX

[75] Inventors: Rolf G. Schuelein, Singhofen; Helmut Deimel, Nastaetten, both of Germany

[73] Assignee: Leifheit AG, Lahn, Germany

[21] Appl. No.: 149,322

[22] Filed: Nov. 9, 1993

[30] Foreign Application Priority Data

Nov. 9, 1992 [DE] Germany .......................... 42 37 718.8

[51] Int. Cl.$^6$ ...................................................... F17C 1/06
[52] U.S. Cl. ........................... 220/558; D7/609; 312/229; 220/334; 220/908
[58] Field of Search ................................... 220/558, 334, 220/908; D7/609; 312/229

[56] References Cited

U.S. PATENT DOCUMENTS

| | | | |
|---|---|---|---|
| D. 161,771 | 1/1951 | Lumley | D7/609 |
| D. 175,521 | 9/1955 | Reinecke | D7/609 |
| D. 188,429 | 7/1960 | Ebstein | D7/609 |
| D. 291,644 | 9/1987 | Osborn | D7/609 |
| 801,880 | 10/1905 | Kauffman | 220/334 |
| 1,941,988 | 1/1934 | Padelford | 220/908 |

FOREIGN PATENT DOCUMENTS 8314927  9/1983  Germany .

Primary Examiner—Stephen F. Gerrity
Assistant Examiner—Tony G. Soohoo
Attorney, Agent, or Firm—Frishauf, Holtz, Goodman, Langer & Chick

[57] ABSTRACT

A breadbox is usable as both a breadbox and a cutting board. The breadbox has a bottom portion (1), opposite side walls (2, 3), and a movable flap (5) which closes off a front opening of the breadbox. The flap has a cutting board surface and at least one shaft for pivotally coupling the flap (5) to the side walls so that the flap (5) is swivelable from a closed position where the flap closes the front opening of the breadbox (5) to an open position where the breadbox is open and the flap (5) is positioned substantially in a horizontal plane, such that the flap (5) has the cutting board surface exposed upwardly so as to be usable as the cutting board. The breadbox has a receptacle for crumbs which is disengageably attached to the front edge of the bottom of the breadbox. The receptacle for crumbs has a first edge which is mounted on the bottom portion, and a second edge that extends under at least a bottom of the flap so that when the flap is swiveled toward the first closed position, crumbs on the work surface of the flap fall into the receptacle for crumbs. There is a gap between the bottom of the flap and the second edge of the receptacle for crumbs. The gap facilitates removal of the receptacle for crumbs from the bottom portion of the breadbox. This structure makes it easy to remove the receptacle for crumbs without disassembling portions of the flap.

22 Claims, 2 Drawing Sheets

BREADBOX

BACKGROUND OF THE INVENTION

1. Field of the Invention

This invention relates to a breadbox, and more particularly to a breadbox having a flap portion that opens and closes a front opening of the breadbox, the flap portion serving as a cutting board when in its open position.

2. Description of the Prior Art

It is known in the prior art to provide a box shaped breadbox. In the prior art, one of the walls of the breadbox is attached to the breadbox main body so that the one wall can be moved from a closed position to an open position to provide access to an interior portion of the breadbox.

SUMMARY OF THE INVENTION

It is an object of the invention to increase the utility of a breadbox.

It is another object of the present invention to provide a combined breadbox and cutting board which is very space-efficient.

It is still another object of the present invention to provide a breadbox which can collect crumbs which are formed when the breadbox functions as a cutting board to enable easy cleaning of the breadbox.

According to the present invention, a breadbox comprises: an open-ended enclosure having a bottom portion (1), and opposite side wall portions (2, 3); and a movable flap portion (5) which closes off a front opening portion of said open-ended enclosure, said flap portion having a cutting board surface; at least one shaft means for pivotally coupling said flap portion (5) to said enclosure so that said flap portion (5) is pivotable relative to said enclosure for enabling said flap portion (5) to be pivotally moved from a first position where said front opening of said enclosure is closed by said flap portion (5) to a second position where said enclosure is open and said flap portion (5) is positioned substantially in a horizontal plane, such that said flap portion (5), when pivoted to said substantially horizontal plane has said cutting board surface exposed upwardly so as to be usable as a cutting board.

DETAILED DESCRIPTION OF THE DRAWINGS

Figure 1:
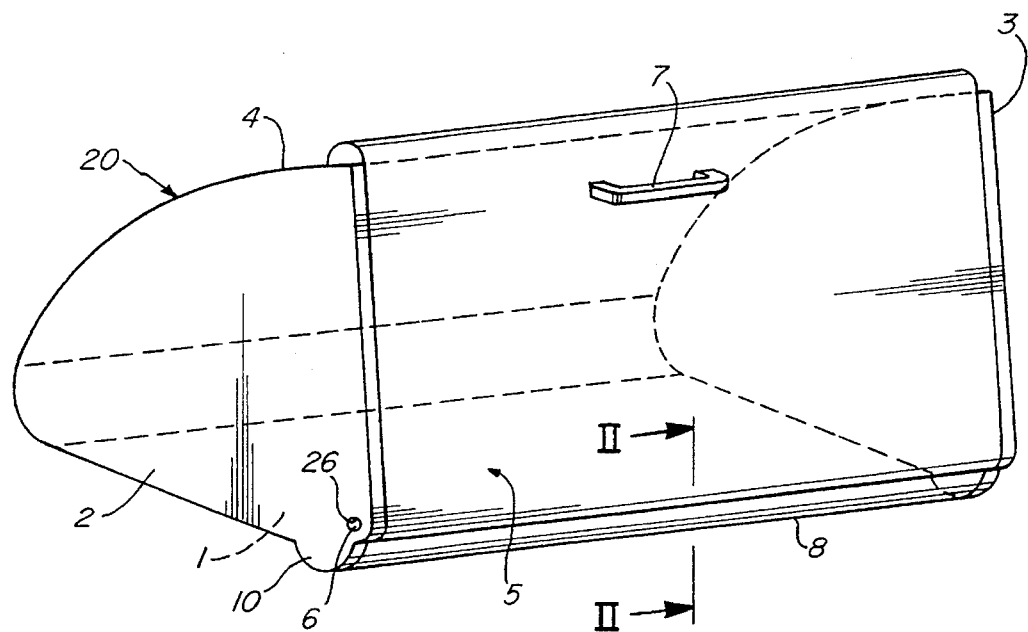
FIG. 1 is a perspective view of a breadbox of the present invention.

Referring to FIG. 1, the breadbox comprises an open-ended enclosure 20 defined by a bottom portion 1, opposite side wall portions 2, 3, spaced apart from each other and a curved top/back wall portion 4 that forms the top wall and the back wall of the open-ended enclosure. The enclosure 20 may take any desired shape. The breadbox also includes a flap or door portion 5 forming an openable front wall of the enclosure 20. The flap portion 5 is pivotally supported in the side walls 2, 3 to be movable about a horizontal shaft 6 that is positioned in holes 26 in side walls 2, 3. When flap portion 5 is pivotally moved downward from a first closed position, in a direction shown by arrow B (FIG. 2), to a second open position shown by the dot-dashed lines in FIG. 2, the flap portion 5 comes to rest in a plane that is substantially the same as a plane in which the bottom portion 1 is provided. The horizontal shaft 6 extends through an elongated aperture in the lower part of the flap portion 5 from side wall 2 to sidewall 3, or respective small (short) shafts (see FIG. 4) may be provided at each end of the flap portion 5 and which extend into respective side walls 2, 3. The flap portion 5, when pivoted about shaft 6 to move in a downward direction to the open (horizontal) position thereof, can function as a cutting board. A cutting board surface 11 is provided on the flap portion 5. A handle 7 is on a top portion of outside surface 17 of flap portion 5, and extends substantially horizontally when the flap portion 5 is in its closed or upright position as shown in FIG. 1. The horizontally extending handle 7 acts to raise and stabilize the front or free end of the cutting board (flap portion 5) when foods are cut on said cutting board surface 11, as shown in FIG. 2.

To facilitate easy removal of crumbs produced when bread, cake and the like are sliced on the cutting board flap portion 5, a crumb collecting trough 8 is provided, which in the exemplary embodiment, is positioned at the front edge 13 of the bottom portion 1 of the breadbox. The trough 8 extends between the side walls 2, 3 and is attached to the bottom portion 1 of breadbox by an attaching means such as an attachment channel 9 which slides onto (over) the forward edge portion 13 of the bottom portion 1 and frictionally holds the trough 8 on the edge portion 13 of the bottom portion 1. The trough 8 and the attachment channel 9 slide off and onto the edge portion 13 of the bottom portion 1 to be easily dismounted and mounted, respectively, to the edge portion 13 of the bottom portion 1 by a pulling and a pushing motion respectively.

Figure 2:
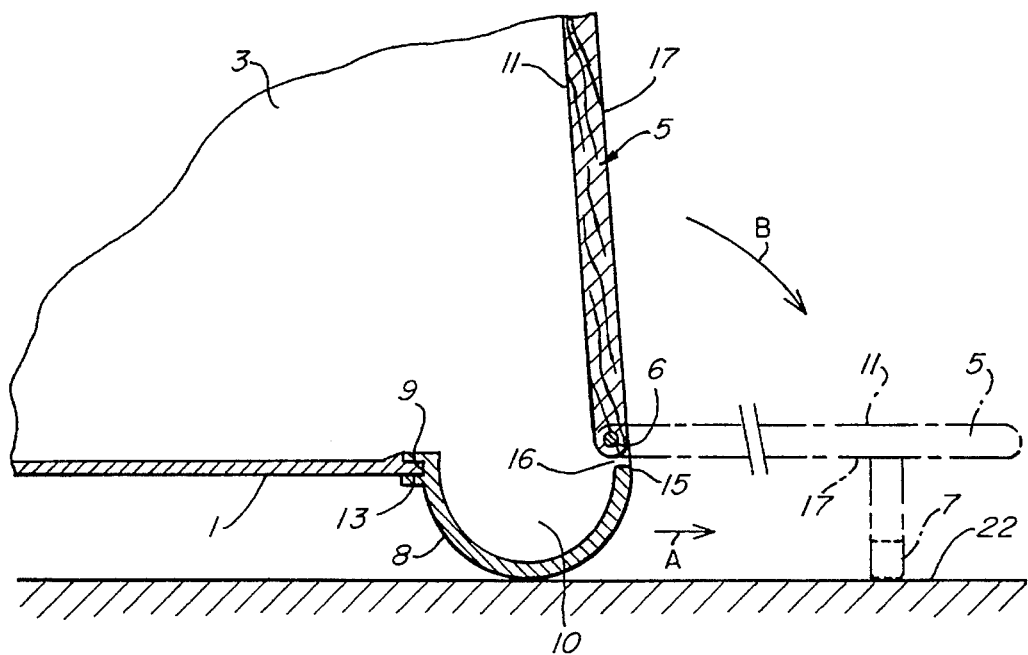
FIG. 2 is an enlarged partial sectional view, taken along the section line II—II in FIG. 1.

The trough 8 is easily removed by pulling it in a direction away from the front edge 13 of the bottom portion 1 in the direction of arrow A in FIG. 2. After the trough 8 is removed, it can be then emptied. For easier emptying, the trough 8 is open on both side ends thereof, and the open side ends of trough 8 are closed off when the trough 8 is seated in the breadbox, by suitably formed lower projections or tabs 10 (see FIG. 1) that respectively are integrally formed with the side walls 2, 3. The projections or tabs 10 extend downwardly below the lower extremity of the trough 8 to support trough 8, on a support surface 22 and to also function as a pair of legs for the breadbox and stabilize the flap portion 5 when the flap portion 5 is open and used as a cutting board, as seen in FIG. 2.

The trough 8 extends between the side wall 2, 3 portions so as to catch therein all crumbs that are on the interior or upper open surface 11 of the flap portion 5. Also, crumbs from inside the breadbox can be caught and retained in the trough 8 for easy removal.

The top and bottom portions of the breadbox enclosure 20, as well as the flap portion 5 of the breadbox, are dimensioned to define an interior space of said breadbox which is larger than a volume of a loaf of bread or a portion of cake which is to be stored in said breadbox.

As indicated by the dot-dashed lines in FIG. 2, the handle 7 serves as a support for stabilizing the flap portion 5 when the flap portion 5 is pivoted downward, and is dimensioned to serve as a leg or support for raising the front end of the flap portion 5 so that the flap portion 5 is in an essentially horizontal plane when in the open position. FIG. 2 also clearly shows that the trough 8 is seated so that the front edge portion 15 thereof is positioned in a plane that is slightly below a bottom edge portion of the flap portion 5 and slightly forward of the interior cutting board surface 11 of the flap portion 5 when the flap portion 5 is pivoted upward, so that all of the crumbs resting on the inside cutting board surface 11 of the flap portion 5 can be easily and reliably moved into the trough 8 by gravity by movement of the flap 5 from its open horizontal position to its closed upright or vertical position. Said forward edge portion 15 of trough 8 is positioned below the gap 16 separates the trough 8 from the bottom portion 1 of the enclosure 20 to facilitate removal of trough 8 from the enclosure 20 a plane of the bottom portion 1. The tip end 15 of the trough 8 is positioned to be forward of an edge of the flap portion 5 when said flap portion 5 is in the open position after the flap portion 5 has been pivoted downward, so that all the crumbs resting on the cutting surface 11 of flap portion 5 can be reliably swept or moved into the trough 8 without scattering and falling out onto the support surface 22 such as a countertop.

A height of the tab or lower projections 10 shown in FIGS. 1 and 2 is substantially equal to a height of the handle 7 to enable said handle 7 to adequately and stably support the flap portion 5 when the flap portion 5 has been pivoted to the downward or horizontal position shown by dot-dashed lines in FIG. 2 so that handle 7 rests on support surface 22 which may be a countertop.

Figure 3:
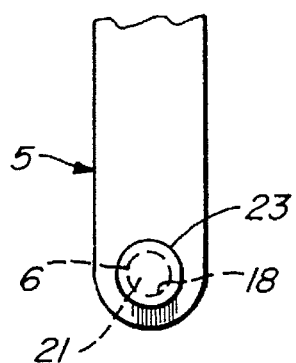
FIG. 3 is an enlarged partial section view of a flap portion 5 showing an aperture 18 formed therein with a horizontal shaft 6 positioned therein.

FIG. 3 shows a bottom portion of flap portion 5 in cross-section. The aperture 18 is formed in the bottom portion of the flap portion 5 and extends therethrough. The aperture 18 may be dimensioned to enable the shaft 6 to be rotatably engaged therein. Adjacent each of the downwardly extending tab portions 10 a hole 26 is provided in side walls 2, 3 for receiving the end portions of shaft 6 therein (see FIG. 3) to rotatably hold the shaft 6 and the flap portion 5 in side walls 2, 3. The shaft 6 may be retained by, for example, rivets or caps 23 mounted on end faces 21 of the shaft 6. See FIG. 3

The shaft 6 may be press-fit into the aperture 18 (FIG. 3) in the bottom portion of the flap portion 5 and have small free end portions extending at opposite ends thereof. The small extending free end portions of shaft 6 can be rotatably mounted in the holes 26 provided in the side walls 2, 3 adjacent the downwardly extending tab portions 10, as shown in FIG. 1. In this case, no retaining means is required to maintain the shaft 6 in position, since it is press-fit in the flap portion 5.

Figure 4:
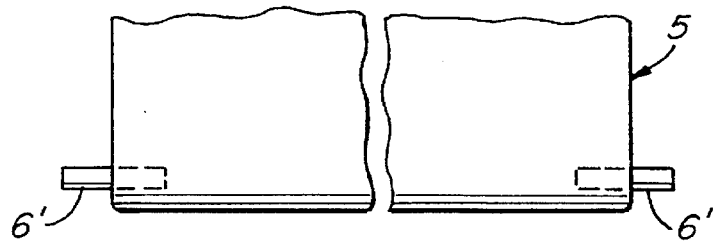
FIG. 4 shows a modified embodiment.

In an another alternative arrangement shown in FIG. 4, the shaft 6 may comprise small shaft portions 6' which are fixedly mounted in end portions of the flap portion 5 so as to respectively extend in opposite directions of the flap portion 5. In this case, the extending ends of the short shaft members 6' are mounted into the holes 26 provided at the lower portion of the side walls 2, 3 so as to be rotatable relative to the side walls 2, 3. FIG. 4 illustrates on a reduced scale the flap portion 5 with small shaft portions 6' extending from opposite ends thereof, which are engageable in the holes 26 of the side walls 2, 3 to provide pivotable mountings of the flap portion 5.

Figure 5:
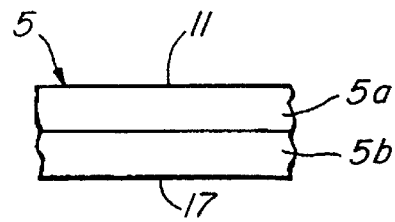
FIG. 5 shows an example of a layered cutting board member.

The flap portion 5 is formed of solid wood as shown in FIG. 2. Alternatively, as shown in FIG. 5, the flap portion 5 may have a layered structure wherein the layer 5b may be wood, metal or plastic and the cutting board layer 5a may be formed of wood, plastic or any other suitable cutting board material.

Various changes and modifications may be made within the scope of the inventive concept as defined in the appended claims.

I claim:

1. A breadbox comprising:

a bottom portion (1) extending in a first plane and having opposite sides;

side walls (2, 3) connected to respective opposite sides of said bottom portion, and defining a front opening of the breadbox;

a flap (5) having a bottom edge, said flap (5) closing the front opening of the breadbox, said flap including a work surface (37);

at least one shaft means for swivelably coupling said flap to said side walls, said at least one shaft means having a horizontal axis (6) positioned in a second plane that is substantially in parallel to and above a support surface (22) on which said breadbox rests;

said flap being swivelable in a downward direction about said horizontal axis (6) from a closed position where said flap (5) closes the front opening of the breadbox to an open position wherein the front opening of the breadbox is open, so that said work surface of said flap, when said flap is in said open position, extends in a third plane which is above said first plane in which the bottom portion (1) extends and which is substantially in parallel with said support surface; and an attachable and detachable receptacle for crumbs (8), said receptacle for crumbs (8) having:

a first edge that is attachably and detachably engageable with a front edge (13) of the bottom portion (1) of the breadbox, whereby the receptacle for crumbs is separable from said breadbox without a need to disassemble the flap, by pulling the receptacle for crumbs in a forward direction away from said front edge (13); and a second edge positioned below the bottom edge of said flap when said flap is in said open position, said second edge of the receptacle for crumbs extending under said flap (5) when the receptacle for crumbs is attached to the bottom portion of the breadbox.

2. The breadbox according to claim 1, wherein:

the receptacle for crumbs comprises a crumb collecting trough shaped member (8), said crumb collecting trough shaped member (8) having open end portions;

said open end portions of said crumb collecting trough shaped member (8) being closed by a respective one of the side walls (2, 3) when said crumb collecting trough shaped member is attached to the front edge (13) of the bottom portion (1) of the breadbox.

3. The breadbox according to claim 1, wherein:

the second edge (15) of said receptacle for crumbs (8) is positioned to be at least under said work surface of said flap as said flap is swiveled to the closed position; and said second edge (15) of said receptacle for crumbs extends in the forward direction away from said front edge (13) of the bottom portion (1) of the breadbox.

4. The breadbox according to claim 1, wherein:

said at least one shaft means pivotally couples said flap to said side walls of the breadbox so that said flap is swivelable relative to said side walls of said breadbox for enabling said flap to be moved from the closed position where the front opening of said breadbox is closed by said flap to the open position where said breadbox is open and said work surface of said flap is positioned in the third plane; and said flap (5), when in the open position, has the work surface thereof exposed upwardly so as to be usable as a cutting board.

5. The breadbox according to claim 1, wherein:

a gap (16) is formed between said second edge (15) of said receptacle for crumbs (8) and the bottom edge of said flap (5), said gap (16) facilitating removal of said receptacle for crumbs (8) from said breadbox when said receptacle for crumbs is to be detached from said bottom portion of said breadbox, by application of a pulling force to said receptacle of crumbs in the forward direction away from the front edge (13) of said bottom portion (1).

6. The breadbox according to claim 1, wherein:

a horizontally extending bracket-like handle (7) is positioned on said flap (5) on an outside surface (17) thereof; and wherein when said bracket-like handle (7) on said flap is pulled by a pulling force acting on said bracket-like handle (7) said flap swivels to the open position thereof where said bracket-like handle (7) serves as an elongated support to stabilize said work surface of said flap (5) in said third plane parallel to said support surface (22) to enable said work surface of said flap (5) to be usable as a cutting board.

7. The breadbox according to claim 1, wherein said side walls (2, 3) include tabs (10) which function as supports for said breadbox (20) when said breadbox rests on said support surface (22).

8. The breadbox according to claim 7, further comprising:

a horizontally extending bracket-like handle (7) mounted on an outside surface (17) of said flap (5); and wherein said tabs (10) and said bracket-like handle (7) have a common height dimension so that when said flap (5) is swiveled to be in said open position thereof, said bracket-like handle (7) stabilizes said flap (5) on said support surface (22), so that said flap (5) is useable as a cutting board.

9. The breadbox according to claim 1, further comprising:

attaching means (9) provided on said receptacle for crumbs (8); and wherein:

said receptacle for crumbs (8) is frictionally mounted on the front edge (13) of said bottom portion (1) of said breadbox (20) by said attaching means (9).

10. The breadbox according to claim 9, wherein said attaching means comprise an attachment channel structure.

11. The breadbox according to claim 9, wherein the attaching means comprises a channel shaped portion provided on the first edge of the receptacle for crumbs.

12. The combined breadbox and cutting board according to claim 11, further comprising:

attaching means (9) provided on said receptacle for crumbs (8); and wherein:

said receptacle for crumbs (8) is frictionally mounted on the front edge (13) of said bottom (1) of said combined breadbox (20) and cutting board by said attaching means (9).

13. The breadbox according to claim 12, wherein said attaching means comprises an attachment channel structure.

14. The breadbox according to claim 12, wherein the attaching means comprises a channel shaped portion provided on the first edge of the receptacle for crumbs.

15. The combined breadbox and cutting board according to claim 11, wherein:

a horizontally extending bracket-like handle (7) is positioned on said flap (5) on an outside surface (17) thereof; and wherein when said bracket-like handle (7) on said flap is pulled by a pulling force acting on said bracket-like handle (7), said flap swivels to the open position thereof where said bracket-like handle (7) serves as an elongated support to stabilize said work surface of said flap (5) in said third plane and parallel to said support surface (22) to enable said flap (5) to be usable as a cutting board.

16. The combined breadbox and cutting board according to claim 11, wherein said side walls (2,3) include tabs (10) which function as supports for said combined breadbox and cutting board (20) when said combined breadbox and cutting board rests on said support surface (22).

17. The combined breadbox and cutting board according to claim 16, further comprising:

a horizontally extending bracket-like handle (7) mounted on an outside surface (17) of said flap (5); and wherein said tabs (10) and said bracket-like handle (7) have a common height dimension so that when said flap (5) is swivelled to have the work surface in said third plane, said bracket-like handle (7) stabilizes said flap (5) on said support surface (22), so that said flap (5) is useable as a cutting board.

18. A combined breadbox and cutting board comprising:

a bottom portion (1) extending in a first plane and having opposite sides;

side walls (2, 3) connected to respective opposite sides of said bottom portion, and defining a front opening of the breadbox;

a flap (5) having a bottom edge, said flap (5) closing the front opening of the breadbox, said flap including a work surface (37);

at least one shaft means for swivelably coupling said flap to said side walls, said at least one shaft means having a horizontal axis (6) positioned in a second plane that is substantially in parallel to and above a support surface (22) on which said breadbox rests;

said flap being swivelable in a downward direction about said horizontal axis (6) from a closed position where said flap (5) closes the front opening of the breadbox to an open position wherein the front opening of the breadbox is open, so that said work surface of said flap, when said flap is in said open position, extends in a third plane which is above said first plane in which the bottom portion (1) extends and which is substantially in parallel with said support surface; and an attachable and detachable receptacle for crumbs (8), said receptacle for crumbs (8) having:

a first edge that is attachably and detachably engageable with a front edge (13) of the bottom portion (1) of the breadbox, whereby the receptacle for crumbs is separable from said breadbox without a need to disassemble the flap, by pulling the receptacle for crumbs in a forward direction away from said front edge (13); and a second edge positioned below the bottom edge of said flap when said flap is in said open position, said second edge of the receptacle for crumbs extending under said flap (5) when the receptacle for crumbs is attached to the bottom portion of the breadbox.

19. The breadbox according to claim 18, wherein:

the receptacle for crumbs comprises a crumb collecting trough shaped member (8), said crumb collecting trough shaped member (8) having open end portions;

said open end portions of said crumb collecting trough shaped member (8) being closed by respective ones of the side walls (2,3) when said crumb collecting trough shaped member (8) is attached to the front edge (13) of the bottom (1) of the combined breadbox and cutting board.

20. The combined breadbox and cutting board according to claim 18, wherein:

the second edge (15) of said receptacle for crumbs (8) is positioned to be under said work surface of said flap as said flap is swiveled to the closed position; and said second edge (15) of said receptacle for crumbs extends in the forward direction away from the front edge of the bottom portion of the combined breadbox and cutting board.

21. The combined breadbox and cutting board according to claim 18, wherein:

said at least one shaft means pivotally couples said flap to said side walls of the combined breadbox and cutting board so that said flap is swivelable relative to said side walls of the combined breadbox and cutting board for enabling said flap to be moved from the closed position where the front opening of said combined breadbox and cutting board is closed by said flap to the open position where said combined breadbox and cutting board is open and said flap is positioned with the work surface in said third plane; and said flap (5), when in the open position thereof, has the work surface exposed upwardly so as to be usable as a cutting board.

22. The combined breadbox and cutting board according to claim 18, wherein:

a gap (16) is formed between said second edge (15) of said receptacle for crumbs (8) and the bottom edge of said flap (5), said gap (16) facilitating removal of said receptacle for crumbs (8) from said combined breadbox and cutting board when said receptacle for crumbs is to be detached from said bottom portion by application of a pulling force to said receptacle of crumbs in the forward direction away from the front edge (13) of said bottom portion (1).

\* \* \* \* \*